(12) United States Patent
Xiao et al.

(10) Patent No.: US 8,098,644 B2
(45) Date of Patent: Jan. 17, 2012

(54) METHOD AND APPARATUS FOR UPLINK RESOURCE ALLOCATION IN A FREQUENCY DIVISION MULTIPLE ACCESS COMMUNICATION SYSTEM

(75) Inventors: Weimin Xiao, Hoffman Estates, IL (US); Amitava Ghosh, Buffalo Grove, IL (US); Robert T. Love, Barrington, IL (US); Rapeepat Ratasuk, Hoffman Estates, IL (US); Yakun Sun, Evanston, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 420 days.

(21) Appl. No.: 11/621,125

(22) Filed: Jan. 9, 2007

(65) Prior Publication Data
US 2007/0178930 A1 Aug. 2, 2007

Related U.S. Application Data

(60) Provisional application No. 60/759,700, filed on Jan. 18, 2006.

(51) Int. Cl.
*H04B 7/208* (2006.01)
(52) U.S. Cl. .......... 370/344; 370/319
(58) Field of Classification Search ......... 370/318, 370/319, 329, 348, 328, 338, 310.2, 344, 370/332–334, 341; 455/452.2, 463, 464, 455/509, 515, 179.1, 443–451, 452.1, 513
See application file for complete search history.

(56) References Cited

U.S. PATENT DOCUMENTS

| | | | |
|---|---|---|---|
| 5,491,837 A | 2/1996 | Haartsen | |
| 5,873,028 A | 2/1999 | Nakamo et al. | |
| 6,405,046 B1 * | 6/2002 | Kumaran et al. | 455/453 |
| 6,542,481 B2 * | 4/2003 | Foore et al. | 370/329 |
| 6,628,956 B2 * | 9/2003 | Bark et al. | 455/522 |
| 6,751,187 B2 * | 6/2004 | Walton et al. | 370/210 |
| 6,850,500 B2 * | 2/2005 | Zeira et al. | 370/328 |
| 7,257,408 B2 | 8/2007 | Kikuchi et al. | |
| 2002/0097703 A1 * | 7/2002 | Nieczyporowicz et al. | 370/342 |
| 2002/0147022 A1 | 10/2002 | Subramanian et al. | |
| 2003/0125068 A1 | 7/2003 | Lee et al. | |
| 2004/0018850 A1 | 1/2004 | Ishiguro et al. | |

(Continued)

FOREIGN PATENT DOCUMENTS

JP 2001024580 1/2001

(Continued)

OTHER PUBLICATIONS

Lee, Heesoo: Technology Overview, IEEE 802.20 Working Group on Mobile Broadband Wireless Access, IEEE C802.20-05/72, Oct. 28, 2005, pp. 1-35.

(Continued)

*Primary Examiner* — Kent Chang
*Assistant Examiner* — San Htun (57) ABSTRACT

To address the need for a resource allocation scheme that results in a better tradeoff between the cell-edge performance and the overall spectral efficiency, a communication system is provided that allocates uplink transmit power to user equipment (UEs) based on a fractional power control scheme. In another embodiment, since the cell-edge users are also likely to be power limited, the communication system may implement a minimized uplink transmission bandwidth resource allocation scheme that may work with the fractional power control scheme to achieve a level of performance desired for uplink transmissions in 3GPP (Third Generation Partnership Project) and 3GPP2 Evolution communication systems.

30 Claims, 5 Drawing Sheets

U.S. PATENT DOCUMENTS

| | | |
|---|---|---|
| 2005/0032514 A1* | 2/2005 | Sadri et al. .................... 455/423 |
| 2005/0143121 A1 | 6/2005 | Huh et al. |
| 2005/0220002 A1 | 10/2005 | Li et al. |
| 2005/0220176 A1 | 10/2005 | Zeira et al. |

FOREIGN PATENT DOCUMENTS

| | | |
|---|---|---|
| JP | 2005354181 A | 12/2005 |
| KR | 1020000039090 A | 7/2000 |
| WO | 02093952 A1 | 11/2002 |
| WO | 2004056008 A1 | 7/2004 |
| WO | 2004086636 A2 | 10/2004 |

OTHER PUBLICATIONS

3GPP TSG RAN WG1 #42, Interference Coordination for Evolved UTRA Uplink Access, Alcatel, 10.2.2, Inter-cell Interference Mitigation/Coordination, uplink, R-05-0695, Aug. 29-Sep. 2, 2005, London, Great Britain, pp. 1-7.

* cited by examiner

METHOD AND APPARATUS FOR UPLINK RESOURCE ALLOCATION IN A FREQUENCY DIVISION MULTIPLE ACCESS COMMUNICATION SYSTEM

CROSS-REFERENCE(S) TO RELATED APPLICATION(S)

The present application claims priority from provisional application Ser. No. 60/759,700, entitled "METHOD AND APPARATUS FOR UPLINK RESOURCE ALLOCATION IN A FREQUENCY DIVISION MULTIPLE ACCESS COMMUNICATION SYSTEM," filed Jan. 18, 2006, which is commonly owned and incorporated herein by reference in its entirety.

FIELD OF THE INVENTION

The present invention relates generally to Single Carrier and Multi-Carrier Frequency Division Multiple Access (FDMA) communication systems, and, in particular, to uplink power control and bandwidth allocation in Single Carrier and Multi-Carrier FDMA communication systems.

BACKGROUND OF THE INVENTION

Single Carrier and Multi-Carrier Frequency Division Multiple Access (FDMA) communication systems, such as IFDMA, DFT-SOFDMA, and OFDMA communication systems, have been proposed for use in 3GPP (Third Generation Partnership Project) and 3GPP2 Evolution communication systems for transmission of data over an air interface. In Single Carrier and Multi-Carrier FDMA communication systems, a frequency bandwidth is split into multiple contiguous frequency sub-bands, or sub-carriers, that are transmitted simultaneously. A user may then be assigned one or more of the frequency sub-bands for an exchange of user information, thereby permitting multiple users to transmit simultaneously on the different sub-carriers. These sub-carriers are orthogonal to each other, and thus intra-cell interference is reduced.

To maximize the spectral efficiency, a frequency reuse factor of one has been proposed for both a downlink and an uplink in Single Carrier and Multi-Carrier FDMA communication systems. With a frequency reuse factor of one, data and control channels in one sector/cell will likely experience interference from other sectors/cells. This is especially true for user equipment (UEs) at the edge of a cell or at bad coverage locations. Therefore, letting each UE in a sector or cell transmit at full power on the uplink results in very poor edge performance. On the other hand, implementation of a traditional power control scheme, wherein each UE in a sector or cell or cell transmits at an uplink power that results in a same received power at a radio access network for each such UE, suffers from a low overall spectral efficiency due to a lack of UEs that can transmit at high data rates.

Therefore, a need exists for resource allocation scheme that results in a better tradeoff between the cell-edge performance and the overall spectral efficiency.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a resource allocation scheme that results in a better tradeoff between the cell-edge performance and the overall spectral efficiency, a communication system allocates uplink transmit power to user equipment (UEs) based on a fractional power control scheme. In addition, since the cell-edge users are also likely to be power limited, the communication system further implements a minimized transmission bandwidth resource allocation to work with the fractional power control scheme to achieve a level of performance desired for uplink transmissions in 3GPP (Third Generation Partnership Project) and 3GPP2 Evolution communication systems.

Generally, an embodiment of the present invention encompasses a method for A method for uplink power allocation in a Frequency Division Multiple Access (FDMA) communication system that includes determining a channel condition in association with each user equipment (UE) of a plurality of user equipment (UEs), determining a path loss threshold based on the determined channel conditions for the plurality of UEs, and determining an uplink transmit power level for a UE of the plurality of UEs based on the channel condition determined in association with the UE and the path loss threshold.

Another embodiment of the present invention encompasses a method for bandwidth allocation in an FDMA communication system wherein a bandwidth is divided into a plurality of sub-bands, the method including determining a channel condition in association with a UE, determining a portion of maximum uplink transmit power that the UE may transmit at based on the determined channel condition, determining an uplink transmit power level per sub-band for the UE, determining a supportable data rate based on the determined uplink transmit power level per sub-band and assuming that the UE is allocated all available sub-bands, and determining a minimum bandwidth for allocation to the UE based on the supportable data rate.

Yet another embodiment of the present invention encompasses a method for allocating uplink resources in an FDMA communication system including determining, by each radio access network (RAN) of a plurality of radio access networks (RANs), a channel condition in association with each UE serviced by the RAN and ranking, by each RAN of the plurality of RANs, the UEs serviced by the RAN based on the determined channel conditions. The method further includes assigning, by each RAN of the plurality of RANs, a block of uplink resources to each UE serviced by the RAN based on the rankings of the UEs, wherein a UE serviced by a first RAN of the plurality of RANs is assigned a same block of uplink resources as a UE serviced by a second RAN of the plurality of RANs when both UEs are associated with similar channel conditions.

Still another embodiment of the present invention encompasses a radio access network (RAN) capable of operating in a FDMA communication system, the RAN comprising a processor that is configured to determine a channel condition in association with each UE of a plurality of UEs, determine a path loss threshold based on the determined channel conditions, and, for each UE of the plurality of UEs, determine an uplink transmit power level based on the channel condition associated with the UE and the path loss threshold.

Yet another embodiment of the present invention encompasses a RAN capable of operating in an FDMA communication system, wherein a bandwidth is divided into a plurality of sub-bands, and wherein the RAN comprises a processor that is configured to determine a channel condition for a UE, determine a portion of maximum uplink transmit power that the UE may transmit at based on the determined channel condition, determine an uplink transmit power level per sub-band for the UE, determine a supportable data rate based on the determined uplink transmit power level per sub-band and assuming that the UE is allocated all available sub-bands, and determine a minimum bandwidth for allocation to the UE based on the supportable data rate.

Still another embodiment of the present invention encompasses a wireless FDMA communication system that includes a first RAN that determines a channel condition for each UE of a first plurality of UEs, ranks the first plurality of UEs based on the determined channel conditions, and assigns different block of uplink resources to each UE of the first plurality of UEs based on the rankings of the first plurality of UEs. The wireless FDMA communication system further includes a second RAN that determines a channel condition measurement for each UE of a second plurality of UEs, ranks the second plurality of UEs based on the determined channel conditions, and assigns different block of uplink resources to each UE of the second plurality of UEs based on the rankings of the second plurality of UEs, and wherein a UE serviced by the first RAN is assigned a same block of uplink resources as a UE serviced by the second RAN when both UEs are associated with similar channel conditions.

Yet another embodiment of the present invention encompasses a wireless user equipment (UE) that is capable of operating in an FDMA communication system, the UE comprising a processor that is configured to measure a downlink channel condition for each sub-band of a plurality of sub-bands, report the measured downlink channel conditions to a radio access network, receives a path loss threshold from the radio access network, and determine an uplink transmit power level based on the measured downlink channel conditions and the path loss threshold.

Figure 1:
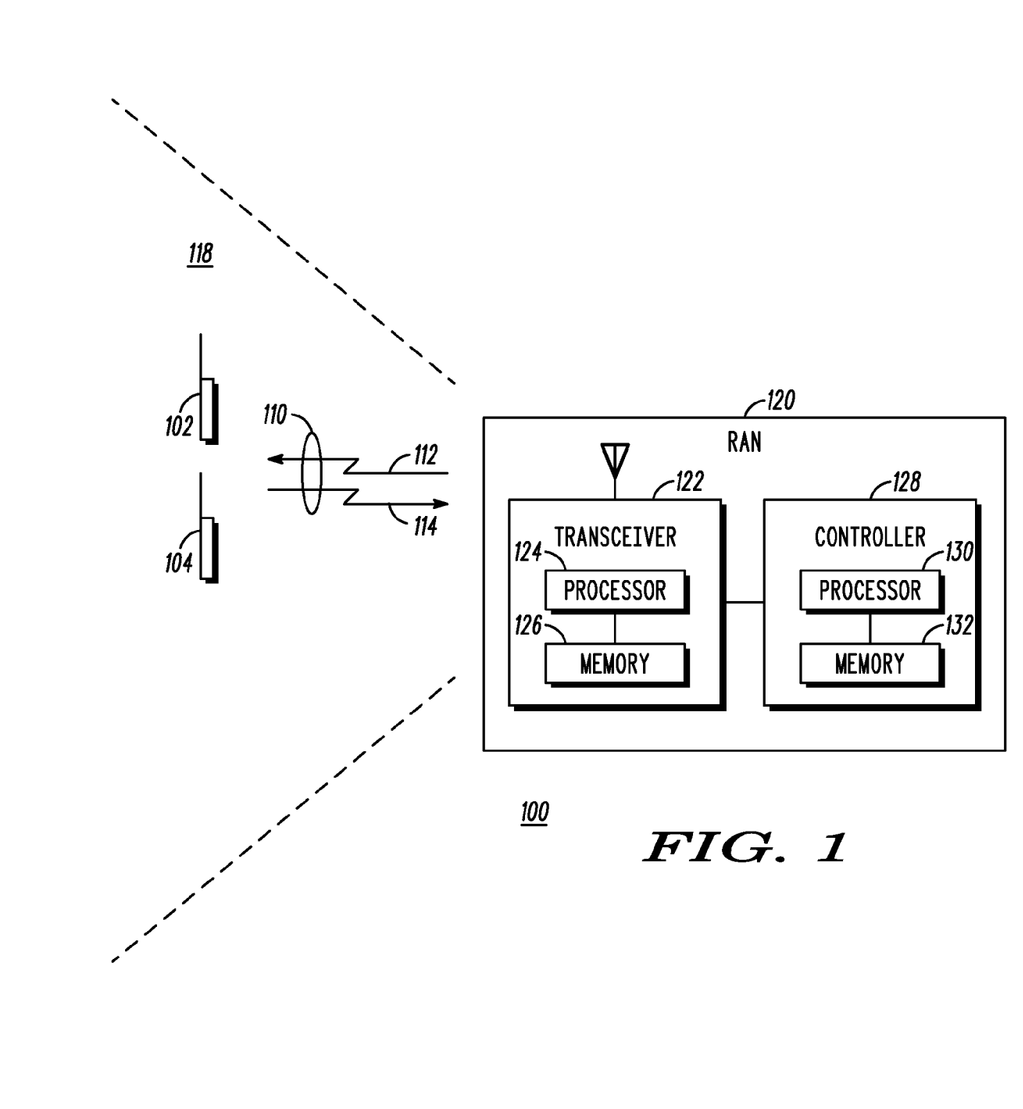
FIG. 1 is a block diagram of a wireless communication system in accordance with an embodiment of the present invention.

The present invention may be more fully described with reference to FIGS. 1-6. FIG. 1 is a block diagram of a wireless communication system 100 in accordance with an embodiment of the present invention. Communication system 100 includes multiple user equipment (UEs) 102, 104 (two shown), such as but not limited to a cellular telephone, a radio telephone, a personal digital assistant (PDA) with radio frequency (RF) capabilities, or a wireless modem that provides RF access to digital terminal equipment (DTE) such as a laptop computer. Communication system 100 further includes a radio access network (RAN) 120 that provides communication services to each UE, such as UEs 102 and 104, residing in a coverage area 118, such as a cell or a sector, of the RAN via an air interface 110. RAN 120 includes a transceiver 122, such as a Node B or a Base Transceiver Station (BTS), in wireless communication with each of the multiple UEs 102, 104 and further includes a network controller 128, such as a Radio Network Controller (RNC) or a Base Station Controller (BSC), coupled to the transceiver. Air interface 110 comprises a downlink 112 and an uplink 114. Each of downlink 112 and uplink 114 comprises multiple physical communication channels, including at least one signaling channel and at least one traffic channel.

Transceiver 122 and controller 128 each includes a respective processor 124, 130, such as one or more microprocessors, microcontrollers, digital signal processors (DSPs), combinations thereof or such other devices known to those having ordinary skill in the art. The particular operations/functions of processors 124 and 130, and respectively thus of transceiver 122 and controller 128, are determined by an execution of software instructions and routines that are stored in a respective at least one memory device 126, 132 associated with the processor, such as random access memory (RAM), dynamic random access memory (DRAM), and/or read only memory (ROM) or equivalents thereof, that store data and programs that may be executed by the corresponding processor.

Figure 2:
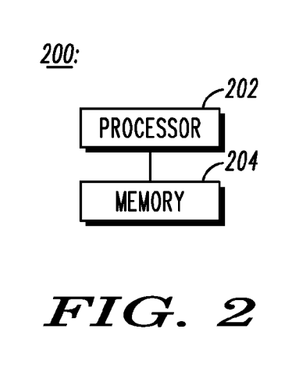
FIG. 2 is a block diagram of a user equipment in accordance with an embodiment of the present invention.

FIG. 2 is a block diagram of a user equipment (UE) 200, such as UEs 102 and 104, in accordance with an embodiment of the present invention. UE 200 includes a processor 202, such as one or more microprocessors, microcontrollers, digital signal processors (DSPs), combinations thereof or such other devices known to those having ordinary skill in the art. The particular operations/functions of processor 202, and respectively thus of UE 200, is determined by an execution of software instructions and routines that are stored in a respective at least one memory device 204 associated with the processor, such as random access memory (RAM), dynamic random access memory (DRAM), and/or read only memory (ROM) or equivalents thereof, that store data and programs that may be executed by the corresponding processor.

The embodiments of the present invention preferably are implemented within UEs 102 and 104 and RAN 120. More particularly, the functionality described herein as being performed by UEs 102 and 104 are implemented with or in software programs and instructions stored in the respective at least one memory device 204 of the UE and executed by an associated processors 202 of the UE. In addition, the functionality described herein as being performed by RAN 120 may be implemented in transceiver 122 or controller 128 or may be distributed among the transceiver and controller, and more particularly may be implemented with or in software programs and instructions stored in the respective at least one memory device 126, 132 of the transceiver or controller and executed by the respective processor 124, 130 of the transceiver or controller. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 102 and 104, transceiver 122, and controller 128. Based on the present disclosure, one skilled in the art will be readily capable of producing and implementing such software and/or hardware without undo experimentation.

Communication system 100 comprises a wideband packet data communication system that employs a Single Carrier or a Multi-Carrier Frequency Division Multiple Access (FDMA) air interface technology, wherein a frequency bandwidth is split into multiple frequency sub-bands, or subcarriers, that comprise the physical layer channels over which traffic and signaling channels are transmitted simultaneously. A user may then be assigned one or more of the frequency sub-bands for an exchange of user information, thereby permitting multiple users to transmit simultaneously on the different sub-carriers. Further, communication system 100 preferably operates in accordance with the 3GPP (Third Generation Partnership Project) E-UTRA (Evolutionary UMTS Terrestrial Radio Access) standards, which standards specify wireless telecommunications system operating protocols, including radio system parameters and call processing procedures. However, those who are of ordinary skill in the art realize that communication system 100 may operate in accordance with any wireless telecommunication system employing a frequency division multiplexing scheme or a time and frequency division multiplexing scheme, wherein a sub-band comprises a frequency sub-band or a time and frequency sub-band, such as a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/HiperLAN2, 802.11g, 802.16, or 802.21 standards, or any of multiple proposed ultrawideband (UWB) communication systems.

In order to optimize system performance at the edges of a coverage area, communication system 100 provides uplink fractional power control and minimum bandwidth allocation. That is, at any given time and for a given coverage area associated with a RAN, such as coverage area 118 and RAN 120, communication system 100 allocates an uplink transmit power to each UE, such as UEs 102 and 104, engaged in a communication session in the coverage area that is designed to provide acceptable received power at the RAN while minimizing interference among all such UEs and UEs in adjacent coverage areas (not shown). In addition, for any given Transmission Time Interval (TTI), the RAN, that is, RAN 120, determines and allocates a minimum amount of bandwidth to each UE 102, 104 engaged in a communication session that is sufficient to provide acceptable service to the UE based on measured channel conditions.

Figure 3:
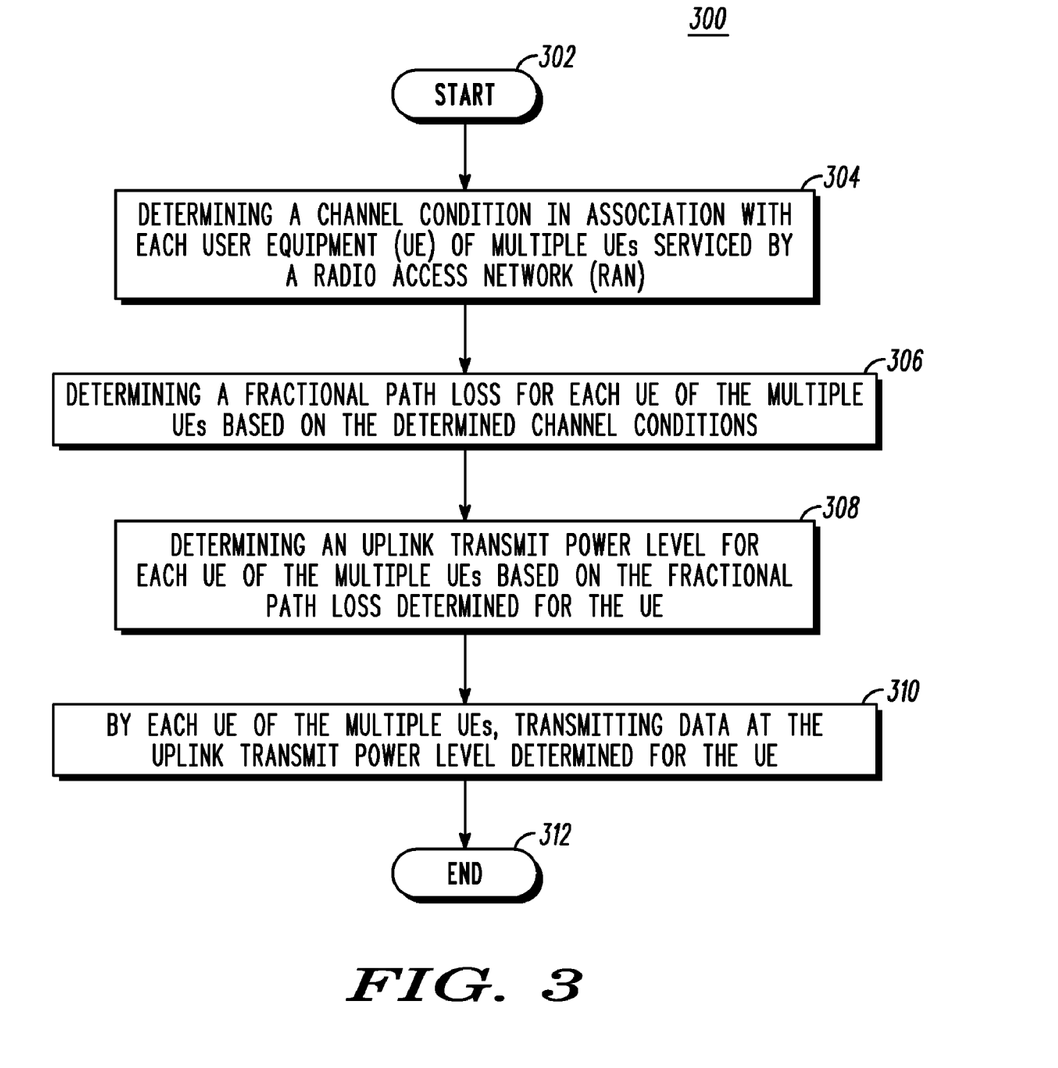
FIG. 3 is a logic flow diagram of a method executed by the communication system of FIG. 1 in providing uplink power control in accordance with an embodiment of the present invention.

Referring now to FIG. 3, a logic flow diagram 300 is provided that depicts a method of uplink resource allocation, and in particular uplink power control, executed by communication system 100 in accordance with an embodiment of the present invention. Logic flow diagram 300 begins (302) when RAN 120 determines (304) a channel condition in association with each UE 102, 104 serviced by the RAN and active in the coverage area of the RAN. In one embodiment of the present invention, each UE 102, 104 may measure a downlink channel condition, preferably measuring Channel Quality Information (CQI) as is known in the art, associated with each sub-band of a bandwidth employed by communication system 100 to produce a plurality of downlink channel measurements. One of ordinary skill in the art realizes that many parameters may be measured in determining channel quality and that any such parameter may be used herein without departing from the spirit and scope of the present invention. As is known in the art, each UE 102, 104 measures channel conditions for each and every sub-band during a measuring period, such as a Transmission Time Interval (TTI) (also known as a sub-frame) or a radio frame transmission period. Each UE of the multiple UEs 102, 104 then reports the measured channel conditions for all of the sub-bands to serving RAN 120, and in particular to a transceiver of the RAN, that is, transceiver 122, preferably in a Channel Quality Information (CQI) message. Each UE of the multiple UEs 102, 104 may further store the UE's downlink channel condition measurements.

In another embodiment of the present invention, RAN 120 may measure an uplink channel condition for each UE 102, 104 serviced by the RAN based on uplink transmissions received from the UE, such as an uplink pilot signal, an uplink control signal, or an uplink traffic signal. One of ordinary skill in the art realizes that there are many ways for a RAN to determine channel conditions associated with a UE serviced by the RAN, and any such method may be used herein without departing from the spirit and scope of the present invention.

Based on the channel condition measurements associated with each UE 102, 104, communication system 100 determines (306) a fractional path loss for each UE 102, 104. That is, RAN 120 determines a path loss (L) for each of UEs 102, 104 and ranks the UEs based on their determined path losses. Typically, path loss L is determined as a ratio of transmit power to received power. For example, RAN may determine a path loss for a UE by averaging path losses associated with each of the sub-bands measured and reported by the UE. However, other algorithms will occur to one of ordinary skill in the art for determining a path loss to be used in ranking a UE, such as using a best path loss or a worst path loss reported by the UE, which algorithms may be used herein without departing from the spirit and scope of the present invention. Based on the rankings, RAN 120 then determines a path loss of a UE that is ranked at a predetermined percentile in the rankings to produce a path loss threshold, that is, a path loss of a UE whose path loss is at the $x^{th}$-percentile level ($L_{x\text{-}ile}$). RAN 120 then compares the actual path loss of the UE (L) to the path loss threshold to determine a fractional path loss for the UE, for example, $L_{x\text{-}ile}/L$.

For each UE of the multiple reporting UEs 102, 104, communication system 100, preferably RAN 120, determines (308) an uplink transmit power level for the UE based on the fractional path loss determined with respect to the UE. RAN 120 may then assign the determined uplink transmit power level to each such UE and inform the UE of the assigned uplink transmit power level. Each UE of the multiple UEs 102, 104 then transmits (310) data to RAN 120, and RAN 120 receives the data from the UE, via uplink 114 of air interface 110 and at the uplink power level determined for the UE until a next uplink power level update period (when logic flow diagram 300 returns to step 304). Logic flow 300 then ends (312). However, in another embodiment of the present invention, RAN 120 may determine a path loss threshold, that is, a path loss of a UE whose path loss is at the $x^{th}$-percentage level ($L_{x\text{-}ile}$), and inform each UE 102, 104 serviced by the RAN of the path loss threshold by broadcasting the path loss threshold in coverage area 118. In response to receiving $L_{x\text{-}ile}$, each UE 102, 104 may store the parameter in the at least one memory device 204 of the UE and then self-determine, at steps 306 and 308, the fractional path loss and the uplink transmit power based on the downlink channel conditions measured by the UE and the stored path loss threshold $L_{x\text{-}ile}$.

At step 308, and for each UE 102, 104, RAN 120 determines, or the UE self-determines, an uplink transmit power level, $P_t$, for the UE based on the UE's maximum transmit power level for transmissions on uplink 114, $P_{max}$, and a fractional power control parameter, $F_{PC}$, associated with the UE. The fractional power control parameter, $F_{PC}$, corresponds to a fraction, or portion, of the UE's maximum transmit power level that the UE is assigned for transmissions on uplink 114 and is based on the fractional path loss associated with the UE. More particularly, RAN 120 determines a uplink transmit power level, $P_t$, for each UE 102, 104, or each UE 102, 104 self-determines an uplink transmit power level $P_t$, based on the following formulas, which formulas are maintained in the at least one memory device 204 of UE 102 and/or in the at least one memory device 126, 132 of transceiver 122 and/or controller 128, $$P_t = P_{max} \times F_{PC}, \text{ where } F_{PC} = \min\{1, \max[R_{min}, (L_{x\text{-}ile}/L)^\alpha]\}$$

$R_{min}$ is a minimum power reduction ratio, that is, a ratio of a minimum uplink transmit power level of a UE in communication system 100 to $P_{max}$. A value corresponding to $R_{min}$ is up to a designer of communication system 100 and is designed to prevent UEs experiencing good path loss, that is, a minimal path loss, from being required to transmit at too low a power level. For example, if it is desired that the minimum uplink transmit power of a UE not be less than one-tenth (1/10) of $P_{max}$, then $R_{min}=0.1$. Again, the ratio $L_{x\text{-}ile}/L$ corresponds to a fractional path loss experienced by a UE, that is, the ratio $L_{x\text{-}ile}/L$ is a comparison of the actual path loss experienced by the UE (L) to a path loss threshold, preferably the path loss of a UE at the $x^{th}$ percentile ($L_{x\text{-}ile}$) of all UEs serviced by RAN 120, or an 'x-percentile path loss.' 'L' is determined based on a downlink channel quality measured by the UE and/or an uplink channel quality measured by RAN 120. Preferably, L includes path loss resulting from shadowing and slow fading but does not include path loss resulting from fast fading. $L_{x\text{-}ile}$ is a path loss of a UE at the $x^{th}$ percentile of all UEs serviced by RAN 120. For example, if 'x-ile'=5, that is, the $5^{th}$ percentile (5%-ile), then when all UEs serviced by RAN 120 are ranked based on path loss, $L_{x\text{-}ile}$ is a path loss of a UE at the $5^{th}$ percentile (from the bottom) of all of the ranked UEs. A result is that all UEs whose path loss L is greater than $L_{x\text{-}ile}$ (the bottom 5% when 'x-ile'=5) may transmit at $P_{max}$, while UEs whose path loss L is less than $L_{x\text{-}ile}$ may each transmit at a power level that is based on the comparison of their path loss L to the path loss threshold, that is, $L_{x\text{-}ile}$.

The parameter 'α' corresponds to how much of a UE's path loss, for the bottom 'x' percent of UEs, communication system 100 wants to compensate for by upward adjusting the uplink transmit power of the UE. Preferably, 'α' is determined by an operator of communication system 100 and is maintained in the respective at least one memory device 126, 132 of transceiver 122 and/or controller 128. RAN 120 may then use 'α' to determine $P_t$ or may broadcast 'α' to the UEs 102, 104 serviced by the RAN so that the UEs may determine $P_t$. In another embodiment of the present invention, the operator of communication system 100 may pre-program 'α' into the at least one memory device 204 of each of UEs 102 and 104. Typically, 1>α>0. When α=0, then all UEs serviced by RAN 120 may transmit at full power ($P_t=P_{max}$) and UEs in the coverage area of RAN 120 are likely to experience high interference levels from the other UEs in the coverage area and poor edge performance, for example, due to the high uplink transmit power levels of UEs closer to RAN 120. When α=1, then all UEs serviced by RAN 120 may transmit at an uplink power level that results in the same received power at RAN 120, resulting in poor spectral efficiency. Experiments have shown that setting α=½ results in good edge coverage and high spectral efficiency. By setting α=½, UEs experiencing good path loss generally end up transmitting at relatively low power levels to reduce interference levels and, at the same time, these UEs are received by a serving RAN at relatively high power levels to achieve high spectral efficiency.

Since users at the edge of a coverage area, such as users at the edge of coverage area 118, are likely to be transmit power limited, communication system 100 further implements a minimized transmission bandwidth resource allocation scheme to work with the fractional power control scheme to achieve a level of performance desired for uplink transmissions in 3GPP (Third Generation Partnership Project) and 3GPP2 Evolution communication systems. By reducing a UE's bandwidth, the power per sub-band for the UE may be effectively boosted, thereby providing edge users with improved performance and a better chance to transmit while enhancing overall spectral efficiency.

Figure 4:
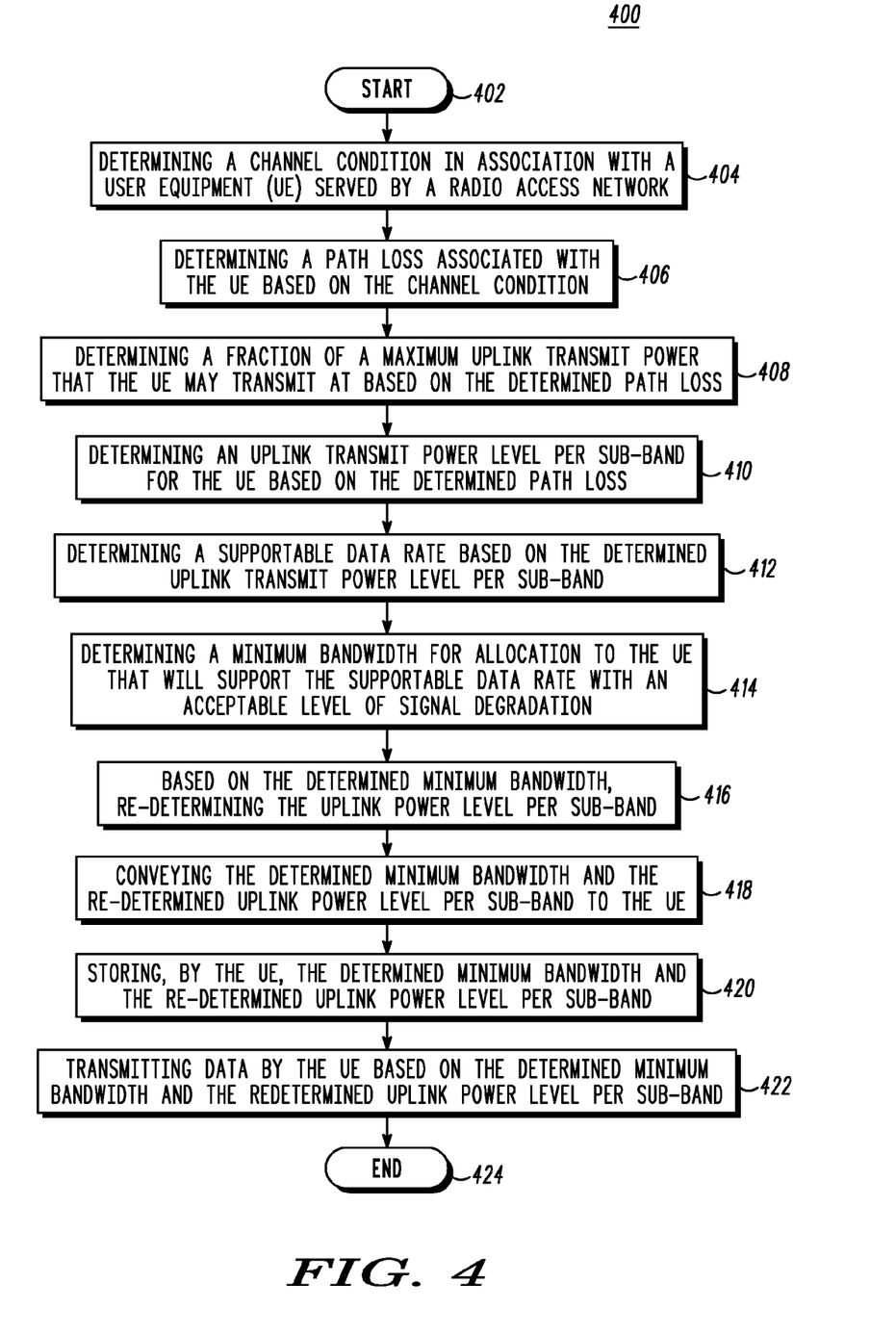
FIG. 4 is a logic flow diagram of a method of resource allocation executed by the communication system of FIG. 1 in accordance with an embodiment of the present invention.

Referring now to FIG. 4, a logic flow diagram 400 is depicted of a method of uplink resource allocation, and in particular bandwidth resource allocation, executed by communication system 100 in accordance with another embodiment of the present invention. Logic flow diagram 400 begins (402) when RAN 120 determines (404) a channel condition in association with each UE 102, 104 serviced by the RAN and active in the coverage area of the RAN. In one embodiment of the present invention, each UE 102, 104 may measure a downlink channel condition, preferably measuring Channel Quality Information (CQI) as is known in the art, associated with each sub-band of a bandwidth employed by communication system 100 and report the measured channel conditions for all of the sub-bands to serving RAN 120, and in particular to a transceiver of the RAN, that is, transceiver 122, preferably in a Channel Quality Information (CQI) message. In another embodiment of the present invention, RAN 120 may measure an uplink channel condition for each UE 102, 104 serviced by the RAN based on uplink transmissions received from the UE, such as an uplink pilot signal, an uplink control signal, or an uplink traffic signal. One of ordinary skill in the art realizes that there are many ways for a RAN to determine channel conditions associated with a UE serviced by the RAN, and any such method may be used herein without departing from the spirit and scope of the present invention. Based on the channel condition measurements, RAN 120, and in particular transceiver 122, determines (406) a path loss for each UE 102, 104, such as UE 102. While references below may be to UE 102, one of ordinary skill in the art realizes that RAN 120 makes similar determinations with respect to UE 104 and UE 104 performs similar functions to the functions described below with respect to UE 102.

Based on the path loss determined for UE 102, RAN 120 determines (408) a fraction, or portion, of the maximum uplink transmit power, $P_{max}$, that UE 102 can transmit at ($F_{PC}$) and further determines (410) an uplink transmit power level per sub-band for the UE ($P_t^{per\ sub\text{-}band}$). Preferably, RAN 120 determines $F_{PC}$ and $P_t^{per\ sub\text{-}band}$ based on the following formulas which are maintained in the at least one memory device 126, 132 of one or more of transceiver 122 and controller 128, $$F_{PC} = \min\{1, \max[R_{min}, (L_{x\text{-}ile}/L)^\alpha]\},$$

$$P_{t\_per\_sub\text{-}band} = P_{max} \times \min(1/N_{SUB}, F_{PC}), \text{ and}$$

Where $F_{PC}$ is a fractional power control parameter as described above in greater detail, $R_{min}$, $L_{x\text{-}ile}$, L, α, and $P_{max}$ are determined as described above with respect to logic flow diagram 300, $N_{TOT}$ is the total number of sub-bands in a given bandwidth, and $N_{SUB}$ is the number of sub-bands in the given bandwidth available for assignment.

Based on the determined uplink transmit power level per sub-band ($P_{t\_per\_sub-band}$), RAN 120 then determines (412) a supportable data rate, R, for UE 102, assuming that the UE is allocated all available sub-bands. Based on the determined supportable data rate, R, RAN 120 then determines (414), for UE 102, a minimum bandwidth for allocation to the UE that will support the determined supportable data rate, R, with an acceptable level of performance, that is, of signal degradation. That is, RAN 120 determines, for UE 102, $$N_{ASSIGN} = \operatorname*{argmin}_{n}\{N_{SUB} \geq n \geq 1 \mid \text{can support } R \text{ with less than } \delta \text{ dB degradation}\}$$

where $N_{ASSIGN}$ corresponds to a minimum bandwidth for allocation to the UE that will support data rate R with less than a δdB degradation in performance. The acceptable degradation in performance, that is, δdB, is up to the designer of system 100. As one ordinary skill in the realizes, the fewer the number of sub-bands allocated to a UE while maintaining a data rate R, the greater the degradation in performance and the lower the quality of service. The supportable data rate, R, and the minimum bandwidth that may be allocated to a UE that will support the determined supportable data rate, R, may be determined based tables containing the results of system throughput simulations or based on curves or equations that are, in turn, based on simulated or empirical evidence, which tables, curves, or equations are maintained in the respective at least one memory device 126, 132 of transceiver 122 and/or controller 128.

Based on the determined minimum bandwidth for allocation to UE 102 that will support data rate R with less than a 'δ' dB degradation in performance, RAN 120 then re-determines, that is, re-calculates, (416) the uplink transmit power level per sub-band for UE 102, that is, recalculates $P_{t\_per\_sub-band}$, to produce a recalculated power level per sub-band, $P_{ASSIGN}$. Preferable, $P_{ASSIGN}$ is determined based on the following formula, $$P_{ASSIGN} = P_{max} \times \min\{1/N_{ASSIGN}, F_{PC}\}.$$

RAN 120 then conveys (418) $N_{ASSIGN}$ and $P_{ASSIGN}$ to UE 102. UE 102 stores (420) $N_{ASSIGN}$ and $P_{ASSIGN}$ in the at least one memory device 204 of the UE and then transmits (422) data to RAN 120, and RAN 120 receives the data from UE 102, via uplink 114 of air interface 110 and based on $N_{ASSIGN}$ and $P_{ASSIGN}$, that is, using $N_{ASSIGN}$ sub-bands and at a power level $P_{ASSIGN}$ in each sub-band. Logic flow 400 then ends (424).

By providing for fractional power control of a UE's uplink transmit power, wherein the fractional power control is based on a fractional path loss associated with the UE, and further providing for an allocation of a minimum amount of uplink bandwidth to a UE that will achieve a level of performance desired for uplink transmissions, communication system 100 provides edge users in a Single Carrier or a Multi-Carrier Frequency Division Multiple Access (FDMA) communication system, such as 3GPP or a 3GPP2 Evolution communication systems such as an E-UTRA communication system, with improved performance and a better chance to transmit while enhancing overall spectral efficiency. However, as a frequency reuse factor of one has been proposed for such communication systems, interference levels may be even further improved by an improved sub-band allocation scheme in each coverage area of multiple, adjacent coverage areas.

Figure 5:
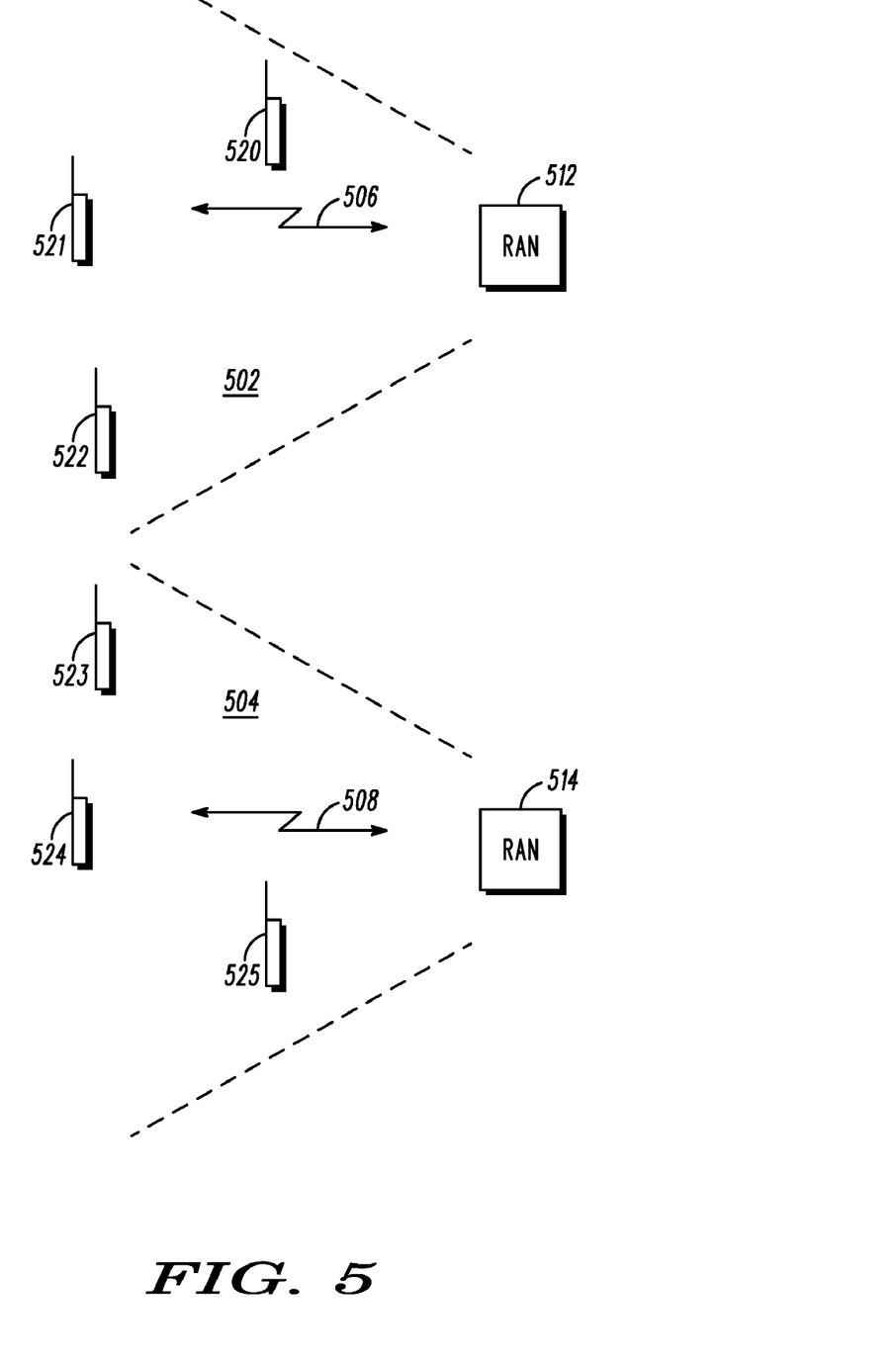
FIG. 5 is a block diagram of a wireless communication system in accordance with another embodiment of the present invention.

Referring now to FIG. 5, a block diagram is provided of a communication system 500 in accordance with another embodiment of the present invention. Communication system 500 is divided into multiple coverage areas 502, 504, such as cells or sectors of a cell, that are each provided wireless communication services by a respective RAN 512, 514. However, in another embodiment of the present invention, each coverage area of the multiple coverage areas 502, 504, such as sectors of a cell, may be provided wireless communication services by a same RAN. Similar to RAN 120, each RAN 512, 514 includes a transceiver, such as a Node B or a Base Transceiver Station (BTS), coupled to a network controller, such as a Radio Network Controller (RNC) or a Base Station Controller (BSC), and the functionality described herein as being performed by RAN 512 or 514 may be implemented in the transceiver or controller of the RAN or may be distributed among the transceiver and controller, and more particularly may be implemented with or in software programs and instructions stored in a respective at least one memory device of the transceiver or controller and executed by a respective processor of the transceiver or controller.

Communication system 500 further includes multiple UEs 520-525 (six shown), wherein a first group of multiple UEs 520-522 reside in a first coverage area 502 of the multiple coverage areas 502, 504 and are serviced by a first RAN 512 of the multiple RANs 512, 514, and a second group of multiple UEs 523-525 reside in a second coverage area 504 of the multiple coverage areas 502, 504 and are serviced by a second RAN 514 of the multiple RANs 512, 514. The RAN serving each coverage area 502, 504 provides wireless communication services to the coverage area via a respective air interface 506, 508, wherein each air interface 506, 508 comprises an uplink (not shown) and a downlink (not shown).

Similar to communication system 100, communication system 500 comprises a wideband packet data communication system that employs a Single Carrier or a Multi-Carrier Frequency Division Multiple Access (FDMA) air interface technology, wherein a frequency bandwidth is split into multiple frequency sub-bands, or subcarriers, that comprise the physical layer channels over which traffic and signaling channels are transmitted simultaneously. A user may then be assigned one or more of the frequency sub-bands for an exchange of user information, thereby permitting multiple users to transmit simultaneously on the different sub-carriers. Further, communication system 100 preferably operates in accordance with the 3GPP (Third Generation Partnership Project) E-UTRA (Evolutionary UMTS Terrestrial Radio Access) standards, which standards specify wireless telecommunications system operating protocols, including radio system parameters and call processing procedures. However, those who are of ordinary skill in the art realize that communication system 500 may operate in accordance with any wireless telecommunication system employing a frequency division multiplexing scheme or a time and frequency division multiplexing scheme, wherein a sub-band comprises a frequency sub-band or a time and frequency sub-band, such as a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/HiperLAN2, 802.11g, 802.16, or 802.21 standards, or any of multiple proposed ultrawideband (UWB) communication systems. Communication system 500 further implements a frequency reuse factor of one, wherein each coverage area of the multiple coverage areas 502, 504 utilizes a same frequency bandwidth.

Communication system 500 provides interference management by allocating a same resource block in each of coverage areas 502, 504 to UEs with a similar path loss and/or transmit power. By allocating a same resource block in each of coverage areas 502, 504 to UEs with a similar path loss and/or transmit power, communication system 500 reduces a likelihood that a UE using a resource block in one coverage area of the multiple coverage areas, such as coverage area 502, will interfere with the utilization of the same resource block by a UE residing in a different coverage area, such as coverage area 504, of the multiple coverage areas.

Figure 6:
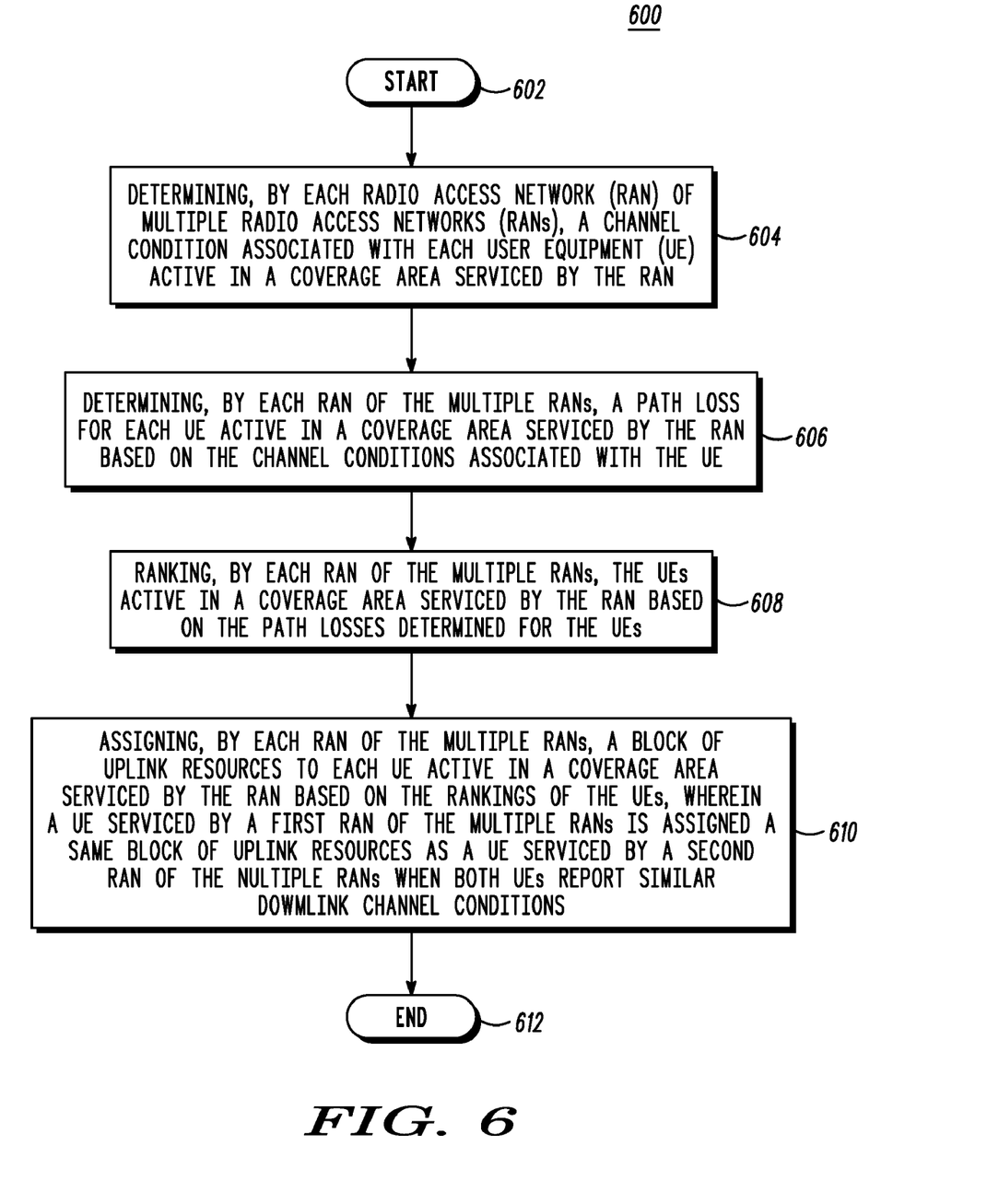
FIG. 6 is a logic flow diagram of a method of resource allocation executed by the communication system of FIG. 5 in accordance with another embodiment of the present invention.

Referring now to FIG. 6, a block diagram 600 is depicted of a method of uplink resource allocation executed by communication system 500 in accordance with the another embodiment of the present invention. Logic flow diagram 600 begins (602) when each RAN 512, 514 determines (604) a channel condition in association with each UE serviced by the RAN and active in the coverage area of the RAN, that is, UEs 520-522 with respect to RAN 512 and UEs 523-525 with respect to RAN 514. In one embodiment of the present invention, each UE of the multiple UEs 520-525 may measure a downlink channel condition, preferably measuring Channel Quality Information (CQI) as is known in the art, associated with each sub-band of the multiple sub-bands in a bandwidth employed in the coverage area wherein the UE resides. Each UE of the multiple UEs 520-525 may then report the measured downlink channel conditions for all of the sub-bands to a RAN serving the UE, and in particular to a transceiver of the RAN, preferably in a Channel Quality Information (CQI) message. For example, each of the first group of UEs 520-522 may report their measured downlink channel conditions to first RAN 512 and each of the second group of UEs 523-525 may report their measured downlink channel conditions to second RAN 514. In another embodiment of the present invention, each RAN 512, 514 may measure an uplink channel condition for each UE serviced by the RAN based on uplink transmissions received from the UE, such as an uplink pilot signal, an uplink control signal, or an uplink traffic signal. Again, one of ordinary skill in the art realizes that there are many ways for a RAN to determine channel conditions associated with a UE serviced by the RAN, and any such method may be used herein without departing from the spirit and scope of the present invention.

Based on the channel condition measurements, each of RANs 512 and 514 determines (606) a path loss for each UE serviced by the RAN. For example, RAN 512 may determine a path loss for each of UEs 520-522 and RAN 514 may determine a path loss for each of UEs 523-525. Each RAN 512, 514 then ranks (608) the multiple UEs served by the RAN, such as UEs 520-522 with respect to RAN 512 and UEs 523-525 with respect to RAN 514, based on the path losses determined for the UEs. Each RAN 512, 514 then assigns (610) a different block of uplink resources, such as a set of one or more sub-bands or an uplink transmit power level, to each UE of the multiple UEs reporting to the RAN based on the UE's ranking. When a block of uplink resources comprises a set of one or more sub-bands, the sub-bands included in the block of uplink resources need not be contiguous in frequency or time. In assigning the block of uplink resources, each RAN 512, 514, assigns a same block of uplink resources to a UE serviced by the RAN, such as UE 522 with respect to RAN 512 and UE 523 with respect to RAN 514, when the UEs, that is, UEs 522 and 523, are associated with similar channel conditions, indicating that the two UEs are experiencing a similar path loss. Logic flow 600 then ends (612).

For example, and merely for the purpose of illustrating the principles of the present invention and not intended to limit the invention in any way, suppose a first UE 522 serviced by RAN 512 experiences a first path loss $PL_1$, a second UE 521 serviced by RAN 512 experiences a second path loss $PL_2$, and a third UE 520 serviced by RAN 512 experiences a third path loss $PL_3$, where $PL_1 > PL_2 > PL_3$. RAN 512 ranks UEs 520-522 based on these path losses and accordingly allocates a first block of uplink resources comprising a first set of sub-bands to UE 522, a second block of uplink resources comprising a second set of sub-bands to UE 521, and a third block of uplink resources comprising a third set of sub-bands to UE 520, wherein the first block of uplink resources comprises more sub-bands than the second block of uplink resources and the second block of uplink resources comprises more sub-bands than the third block of uplink resources.

Further, suppose a fourth UE 523 serviced by RAN 514 experiences a fourth path loss $PL_4$, a fifth UE 524 serviced by RAN 514 experiences a fifth path loss $PL_5$, and a sixth UE 525 serviced by RAN 514 experiences a sixth path loss $PL_6$, where $PL_4 > PL_5 > PL_6$. RAN 514 ranks UEs 523-525 based on these path losses and allocates a fourth block of uplink resources to UE 523, wherein the fourth block of uplink resources comprises the same set of sub-bands as the first block of uplink resources. RAN 514 further allocates a fifth block of uplink resources comprising a fifth set of sub-bands to UE 524, wherein the fifth block of uplink resources comprises the same set of sub-bands as the second block of uplink resources, and RAN 514 allocates a sixth block of uplink resources comprising a sixth set of sub-bands to UE 525, wherein the wherein the sixth block of uplink resources comprises the same set of sub-bands as the third block of uplink resources. Thus a same set of sub-bands is allocated to UE 522 in coverage area 502 and to UE 523 in coverage area 504, a same set of sub-bands is allocated to UE 521 in coverage area 502 and to UE 524 in coverage area 504, and a same set of sub-bands is allocated to UE 520 in coverage area 502 and to UE 525 in coverage area 504. By assigning a same block of uplink resources to UEs in each coverage area experiencing similar channel conditions, communication system 500 reduces the likelihood that a UE utilizing a block of uplink resources in one coverage area will interfere with a UE utilizing the same block of uplink resources in another coverage area.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms 'including' and/or 'having', as used herein, are defined as comprising. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions. An element preceded by " . . . a" does not, without more constraints, preclude the existence of additional identical elements in the process, method, article, or apparatus that the element.

What is claimed is:

1. A method for uplink power allocation in a Frequency Division Multiple Access communication system comprising:
   determining a channel condition in association with each user equipment (UE) of a plurality of user equipment (UEs) served by a radio access network;
   determining a parameter alpha, wherein alpha is a function of a quantity of UEs of the plurality of UEs, which quantity is fewer than the plurality of UEs, whose uplink transmit power is desired to be adjusted;
   determining a maximum transmit power of each UE;
   determining a path loss threshold based on the determined channel conditions for the plurality of UEs; and
   determining an uplink transmit power level for a UE of the plurality of UEs based on the parameter alpha, the maximum transmit power, the channel condition determined in association with the UE and the path loss threshold.

2. The method of claim 1, further comprising determining an actual path loss for the user equipment (UE) of a plurality of user equipment (UEs) based on the channel condition associated with the UE and wherein determining an uplink transmit power level for the UE comprises determining an uplink transmit power level for the UE based on the actual path loss for the UE and the path loss threshold.

3. The method of claim 1, wherein determining a path loss threshold comprises:
   ranking the plurality of user equipment based on the channel condition associated with each user equipment of the plurality of user equipment; and
   determining a path loss of a user equipment of the plurality of user equipment that corresponds to a predetermined percentile in the rankings to produce a path loss threshold.

4. The method of claim 1, wherein determining an uplink transmit power level for a user equipment (UE) of the plurality of user equipment (UEs) comprises:
   determining a maximum transmit power for the UE;
   determining a fractional power control parameter for the UE based on the channel condition associated with the UE and the path loss threshold; and
   determining an uplink transmit power level for the UE based on the maximum transmit power and the fractional power control parameter.

5. The method of claim 1, wherein determining an uplink transmit power for each user equipment (UE) of a plurality of user equipment (UEs) comprises determining an uplink transmit power for each UE based on the following formula:

$$P_t = P_{max} \times \min\{1, \max[R_{min}, (L_{x\text{-}ile}/L)^\alpha]\}.$$

wherein $P_t$ is the uplink transmit power level to be assigned to the UE, $P_{max}$ is the maximum uplink transmit power level of the UE, $R_{min}$, is a minimum power reduction ratio, L is a measured path loss associated with the UE, $L_{x\text{-}ile}$ is a path loss threshold, and $\alpha$ is a parameter set by a system operator.

6. The method of claim 1, further comprising, for each user equipment (UE) of the plurality of user equipment (UEs), conveying to the UE the uplink transmit power level determined for the UE.

7. The method of claim 6, further comprising receiving an uplink transmission from a user equipment plurality of user equipment based on the uplink transmit power level determined for the UE.

8. The method of claim 1, wherein determining an uplink transmit power level for each UE of the plurality of UEs comprises:
   broadcasting the determined path loss threshold;
   determining, by each UE of the plurality of UEs, an uplink transmit power level for the UE based on the downlink channel condition measurement for the UE and the path loss threshold.

9. A method for bandwidth allocation in a Frequency Division Multiple Access communication system wherein a bandwidth is divided into a plurality of sub-bands, the method comprising:
   determining a channel condition in association with a user equipment (UE);
   determining a portion of maximum uplink transmit power that the UE may transmit at based on the determined channel condition;
   determining an uplink transmit power level per sub-band for the UE;
   determining a supportable data rate based on the determined uplink transmit power level per sub-band and assuming that the UE is allocated all available sub-bands; and
   determining a minimum bandwidth for allocation to the UE based on the supportable data rate, wherein the minimum bandwidth is fewer sub-bands than the sub-bands considered in determining the supportable data rate and wherein determining a minimum bandwidth comprises determining a minimum bandwidth that will support the supportable data rate with an acceptable level of signal degradation.

10. The method of claim 9, further comprising re-determining, based on the determined minimum bandwidth, the uplink transmit power level per sub-band for the user equipment.

11. The method of claim 10, further comprising conveying the determined minimum bandwidth and the re-determined uplink transmit power level per sub-band to the user equipment.

12. The method of claim 11, further comprising receiving an uplink transmission from the user equipment based on the determined minimum bandwidth and the re-determined uplink transmit power level per sub-band.

13. A method for allocating uplink resources in a Frequency Division Multiple Access communication system comprising:
   determining, by each radio access network (RAN) of a plurality of radio access networks (RANs), a channel condition in association with each user equipment (UE) serviced by the RAN;
   ranking, by each RAN of the plurality of RANs, the user equipment (UEs) serviced by the RAN based on the determined channel conditions; and
   assigning, by each RAN of the plurality of RANs, a block of uplink resources to each UE serviced by the RAN based on the rankings of the UEs, wherein a UE serviced by a first RAN of the plurality of RANs is assigned a same block of uplink resources as a UE serviced by a second RAN of the plurality of RANs when both UEs are associated with similar channel conditions.

14. The method of claim 13, wherein a block of uplink resources comprises one or more sub-bands of a plurality of sub-bands.

15. The method of claim 13, wherein a block of uplink resources comprises an uplink transmit power level.

16. A radio access network capable of operating in a Frequency Division Multiple Access communication system, the radio access network comprising a processor that is configured to determine a channel condition in association with each user equipment (UE) of a plurality of user equipment (UEs) served by the radio access network, determine a parameter alpha, wherein alpha is a function of a quantity of UEs of the plurality of UEs, which quantity is fewer than the plurality of UEs, whose uplink transmit power is desired to be adjusted, determine a maximum transmit power of each UE, determine a path loss threshold based on the determined channel conditions, and, for each UE of the plurality of UEs, determine an uplink transmit power level based on the parameter alpha, the maximum transmit power, the channel condition associated with the UE and the path loss threshold.

17. The radio access network of claim 16, wherein the processor is configured to determine an actual path loss for the user equipment (UE) of a plurality of user equipment (UEs) based on the channel condition associated with the UE and is further configured to determine an uplink transmit power level for the UE by determining an uplink transmit power level for the UE based on the actual path loss for the UE and the path loss threshold.

18. The radio access network of claim 16, wherein the processor is configured to determine a path loss threshold by ranking the plurality of user equipment based on the determined channel conditions and determining a path loss of a user equipment of the plurality of user equipment that corresponds to a predetermined percentile in the rankings to produce a path loss threshold.

19. The radio access network of claim 16, wherein the processor is configured to determine an uplink transmit power level for a user equipment (UE) of the plurality of user equipment (UEs) by determining a maximum transmit power for the UE, determining a fractional power control parameter for the UE based on the channel condition associated with the UE and the path loss threshold, and determining an uplink transmit power level for the UE based on the maximum transmit power and the fractional power control parameter.

20. The radio access network of claim 16, wherein the radio access network further comprises an at least one memory device that maintains the following formula '$P_t = P_{max} \times \min\{1, \max[R_{min}(L_{x\text{-}ile}/L)^\alpha]\}$,' where $P_t$ is the uplink transmit power level to be assigned to the UE, $P_{max}$ is the maximum uplink transmit power level of the UE, $R_{min}$ is a minimum power reduction ratio, L is a measured path loss associated with the UE, $L_{x\text{-}ile}$ is a path loss threshold, and $\alpha$ is a parameter set by a system operator, and wherein the processor is configured to determine an uplink transmit power for each user equipment (UE) of a plurality of user equipment (UEs) based on the formula.

21. The radio access network of claim 16, wherein the radio access network further, for each user equipment (UE) of the plurality of user equipment (UEs), conveys to the UE the uplink transmit power level determined for the UE.

22. The radio access network of claim 21, wherein the radio access network further receives an uplink transmission from a user equipment of the plurality of user equipment based on the uplink transmit power level determined for the UE.

23. A radio access network capable of operating in a Frequency Division Multiple Access communication system, wherein a bandwidth is divided into a plurality of sub-bands, and wherein the radio access network comprises a processor that is configured to determine a channel condition for a user equipment (UE), determine a portion of maximum uplink transmit power that the UE may transmit at based on the determined channel condition, determine an uplink transmit power level per sub-band for the UE, determine a supportable data rate based on the determined uplink transmit power level per sub-band and assuming that the UE is allocated all available sub-bands, and determine a minimum bandwidth for allocation to the UE based on the supportable data rate, wherein the minimum bandwidth is fewer sub-bands than the sub-bands considered in determining the supportable data rate and wherein determining a minimum bandwidth comprises determining a minimum bandwidth that will support the supportable data rate with an acceptable level of signal degradation.

24. The radio access network of claim 23, wherein the processor is further configured to re-determine, based on the determined minimum bandwidth, the uplink transmit power level per sub-band for the user equipment.

25. The radio access network of claim 24, wherein the radio access network further conveys the determined minimum bandwidth and the re-determined uplink transmit power level per sub-band to the user equipment.

26. The radio access network of claim 25, wherein the radio access network further receives an uplink transmission from the user equipment based on the determined minimum bandwidth and the re-determined uplink transmit power level per sub-band.

27. A wireless Frequency Division Multiple Access communication system comprising:
a first radio access network that determines a channel condition for each user equipment (UE) of a first plurality of user equipment (UEs), ranks the first plurality of UEs based on the determined channel conditions, and assigns different block of uplink resources to each UE of the first plurality of UEs based on the rankings of the first plurality of UEs;
a second radio access network that determines a channel condition measurement for each user equipment (UE) of a second plurality of user equipment (UEs), ranks the second plurality of UEs based on the determined channel conditions, and assigns different block of uplink resources to each UE of the second plurality of UEs based on the rankings of the second plurality of UEs; and
wherein a UE serviced by the first radio access network is assigned a same block of uplink resources as a UE serviced by the second radio access network when both UEs are associated with similar channel conditions.

28. The radio access network of claim 27, wherein an uplink resource block comprises one or more sub-bands of a plurality of sub-bands.

29. The radio access network of claim 27, wherein an uplink resource block comprises uplink transmit power level.

30. A wireless user equipment (UE) capable of operating in a Frequency Division Multiple Access communication system, the UE comprising a processor that is configured to determine a measured path loss, determine a maximum uplink transmit power of the UE, receive a broadcast parameter alpha, wherein alpha is based on a quantity of UEs of a plurality of UEs served by a same radio access network, which quantity is fewer than the plurality of UEs, whose uplink transmit power is desired to be adjusted, transmit a pilot signal, receive a path loss threshold associated with the transmitted pilot signal, and determine an uplink transmit power level based on the measured path loss, the broadcast parameter alpha that is used to scale the measured path loss, the maximum transmit power, and the received path loss threshold.

* * * * *